Patented Aug. 28, 1951

2,566,237

UNITED STATES PATENT OFFICE 2,566,237

WAX AND POLYMERIC POLYAMINE COMPOSITIONS

David M. McQueen and James H. Werntz, Wilmington, Del., assignors to E. I. du Pont de Nemours & Company, Wilmington, Del., a corporation of Delaware No Drawing. Application March 25, 1949, Serial No. 83,524

13 Claims. (Cl. 260—28.5)

This invention relates to new compositions of matter and to methods for their preparation. More particularly this invention relates to water-repellent compositions and to articles and substrates containing such compositions.

This invention has as an object to provide new compositions having water-repellent properties and to provide methods for their preparation. A further object is to provide articles and substrates containing coatings of these new water-repellent compositions. A still further object is to provide textile materials having water-repellent coatings. Other objects will appear hereinafter.

These objects are accomplished by providing new compositions comprising a blend of a wax and a polymeric amine obtained by the reduction of a polymer containing a plurality of carbon-nitrogen linkages, the carbon in said linkages being joined directly to the nitrogen through a linkage from the group consisting of triple and single bonds, any remaining valences of the nitrogen in said linkages being satisfied solely by doubly bonded oxygen, said polymeric amine having a main polymer chain consisting solely of carbon atoms with the amino groups attached to said main polymer chain solely through hydrocarbon radicals which are lateral substituents thereon. The preferred new compositions comprise a blend of a wax and a polymeric amine obtained by the reduction of linear polymers containing acrylonitrile or alkacrylonitrile units, said polymeric amine having a main polymer chain consisting solely of carbon atoms with the amino groups attached to said main polymer chain through aminomethyl groups which are lateral substituents thereon. Articles and substrates containing coatings of these new compositions have water-repellent properties. These polymeric amines are also referred to herein as polymeric polyamines, the prefix "poly" in polyamine indicating that the polymer contains many amine groups.

In preparing the compositions of this invention, the polymeric polyamine is dissolved either in an organic solvent or in a dilute aqueous solution of a volatile acid in amount sufficient to give a 0.1% to 30% solution by weight. The wax is added next in amount sufficient to provide a wax to polymeric polyamine weight ratio of from 1:5 to 1200:1, and preferably of from 2:1 to 10:1, and the blend is then stirred until a homogeneous mixture is obtained. The resulting composition is then reduced with organic solvent, or water, to provide a blend containing from 0.5 to 20% wax by weight, and preferably from 2 to 8% wax.

Although in the above, the wax component of the composition has been added to a solution of the polymeric polyamine, the compositions can be made by melting the wax and the polymeric polyamine together, preferably in the above defined ratios. The blends can be used as such, or the fused blend can be dissolved in an organic solvent, or the molten blend can be dispersed by stirring into an aqueous solution of an acid. A simple admixture of the wax and polymeric polyamine in the desired proportions can be dissolved in organic solvents to provide a blend of the wax and polymeric polyamine.

The examples which follow are submitted to illustrate and not to limit this invention. Unless otherwise stated parts are by weight.

Example I

A solution was prepared by dissolving 2 parts of a polymeric polyamine, prepared by the reductive amination of a butadiene/acrylonitrile polymer as described subsequently, in 2 parts of acetic acid. To this solution there was added 4 parts of methylenedistearamide and the mixture milled until a smooth paste was formed. The paste was thereafter diluted with water to a methylenedistearamide : polmeric polyamine : acetic acid : water concentration of 2:1:1:96.

A 9" x 9" square of white cotton sateen was impregnated by dipping it in the above solution, squeezing it by passing it through a wringer roll with the pressure adjusted so that the total pick-up of solution was equal to the dry weight of the fabric. The impregnated fabric was allowed to air-dry and was then heated for 10 minutes at 120° C. The treated fabric was found to have an initial water-repellency of 90 and to maintain a spray-rating of 70 after three launderings.

The water-repellency values referred to above and in the subsequent examples were determined by the method described in the Year Book of the American Association of Textile Chemists and Colorists 23, 240–4 (1946).

The laundry tests mentioned above and in subsequent examples were carried out as follows:

The fabric was washed for forty minutes at a starting temperature of 100° C. in a mechanical laundering machine having a reversible cycle, using a washing solution containing 36 parts of soap, 18 parts of sodium carbonate, and 18,000 parts of water and maintaining a total load of 1000 parts. After each laundering the fabric was rinsed in distilled water and after the first and third launderings, it was squeezed, allowed to air-dry, and then heated for the time and temperature specified, after which spray ratings were determined.

The polymeric polyamine used in the above experiment was prepared as follows:

A solution of 50 parts of a butadiene/acrylonitrile polymer containing 5.92% nitrogen, which corresponds to 22.4% acrylonitrile and to a butadiene/acrylonitrile mole ratio of 3.53:1, and a relative viscosity of 1.076 in benzene (measured at a concentration of 0.5 gram per 100 ml. of benzene at 25° C.), and 67 parts of decahydronaphthalene was heated for 2 hours at 75° C. with 3 parts of a palladium-on-carbon catalyst under 1000 to 2000 pounds per square inch hydrogen pressure. The mixture was filtered to remove the catalyst and heated to 210° C. under 10 mm. pressure to remove the solvent. There was obtained 34 parts of a viscous oil having an iodine number of 128 and containing 0.8% primary amino nitrogen.

Thirty parts of this partially hydrogenated polymer was dissolved in 90 parts of decahydronaphthalene and this solution, together with 3 parts of alloy-skeleton nickel and 50 parts of anhydrous ammonia, was heated in an oscillating autoclave for 19 hours at 250° C. and 930 to 950 atm. hydrogen pressure. The reaction mixture was filtered to remove the catalyst and heated at 200° C. under 1 mm. pressure to remove the solvent. There was obtained 22 parts of a highly viscous liquid, soluble in 5% aqueous acetic acid. This polymer contained 5.60% total nitrogen and 4.09% of primary amino nitrogen, indicating that about 73% of the nitrile groups had been reduced to aminomethyl groups. The carbon content was 81% and the hydrogen content 13.03%. This polymer had a molecular weight of 1100, as determined ebullioscopically in benzene.

*Example II*

A dispersion was prepared by mixing 3 parts of methylenedistearamide with 1.5 parts of a polymeric polyamine, prepared as described subsequently, dissolved in 4.5 parts of acetic acid. The dispersion was diluted with water to a methylenedistearamide / polymeric polyamine / acetic acid/water ratio of 3:1.5:4.5:91. This dispersion was applied to cotton sateen, as described in Example I, and the treated fabric cured 10 minutes at 135° C. The initial spray-rating of the treated fabric was 80 and this rating was maintained after three launderings.

The polymeric polyamine used in the above experiment was made as follows:

A mixture of 30 parts of a styrene/acrylonitrile polymer containing 7.57% nitrogen, which corresponds to an acrylonitrile mole percent of 44% and a styrene/acrylonitrile mole ratio of 1.27:1, 3 parts of alloy-skeleton nickel and 60 parts of anhydrous ammonia was placed in a pressure reactor and heated at 250° C. for 5 hours under 800 to 1000 atm. hydrogen pressure. The reaction product was taken up in hot toluene, in which it was soluble, and filtered to remove the catalyst. Evaporation of the solvent under reduced pressure gave 18 parts of a polymeric polyamine containing 7.26% total nitrogen, 1.83% primary amino nitrogen, 83.63% carbon and 8.37% hydrogen. From these data it may be calculated that the polymer had one primary amino group per 18.8 linear chain carbons.

*Example III*

Three parts of a polymeric polyamine, prepared as described subsequently, was dissolved in 30 parts of water and 3 parts of glacial acetic acid by heating to 70° C. To the solution there was added 6 parts of paraffin wax and the mixture stirred for 6 minutes. Thereafter there was added 18 parts of water, while holding the temperature at 70° C. for 5 minutes. The dispersion was then diluted with water to yield a bath containing a wax/polymeric polyamine/acetic acid/water ratio of 4:2:2:92. Cotton sateen fabric was impregnated with this bath as described in Example I. The treated fabric had an initial spray-rating of 100 when cured 10 minutes at 120° C. and after three launderings the spray-rating was 70+.

The polymeric polyamine used in the above example was prepared as follows:

A solution of 30 parts of an acrylonitrile/1,3-butadiene polymer, produced by copolymerizing a 4:1 molar mixture of butadiene and acrylonitrile in 150 parts of dioxane, was placed in a closed reactor with 15 parts of nickel-on-kieselguhr catalyst containing 35% total nickel, and 30 parts of anhydrous ammonia. The reactor was agitated at 250° C. under 900 atmospheres hydrogen pressure for 10 hours. After removal of the catalyst, the solvent was evaporated, leaving 21 parts of a colorless, viscous polymeric amine which was soluble in 5% acetic acid. The polymer contained 5.12% nitrogen and had an iodine number of 58.

*Example IV*

A solution was prepared by dissolving 4 parts of paraffin wax and 2 parts of a polymeric polyamine, prepared as described subsequently, in 94 parts of warm benzene. The solution was used to impregnate white cotton sateen as described in Example I. The treated fabric had an initial spray-rating of 100 when cured 10 minutes at 120° C. After three launderings the spray-rating was 70.

The polymeric polyamine used in the above example was prepared as follows:

Forty parts of a butadiene/methacrylonitrile polymer having a molecular weight of 1200 (determined ebullioscopically in benzene), in 160 parts of dioxane, 12 parts of alloy-skeleton cobalt catalyst, and 40 parts of anhydrous ammonia were placed in a closed reactor and heated for 15 hours at 250° C. under 900 to 930 atmospheres hydrogen pressure. Thereafter the reaction mixture was permitted to cool to room temperature, the reactor was opened and discharged. After filtering off the catalyst and removing the solvent under reduced pressure, there was left 40 parts of nearly colorless, viscous polymeric amine soluble in 5% acetic acid, neutral equivalent 325, and analyzing 6.18% primary amino nitrogen.

*Example V*

A dispersion was prepared by dissolving 4 parts of paraffin wax and 2 parts of a polymeric polyamine, prepared by the reductive amination of a butadiene/acrylonitrile polymer, characterized by having a neutral equivalent of 1057, an iodine number of 165 and analyzing 1.91% primary amino nitrogen, in 94 parts of benzene. The solution was used to impregnate cotton sateen as described in Example I. The treated fabric had an initial spray-rating of 100 when cured 10 minutes at 135° C. After three launderings the spray-rating was 80.

Example VI

A solution was prepared by dissolving 4 parts of paraffin wax and 2 parts of a polymeric polyamine, prepared as described subsequently, in 94 parts of warm benzene. The solution was used to impregnate white cotton sateen as described in Example I. The treated fabric had good repellency when cured 10 minutes at 120° C. After three launderings the repellency continued to be satisfactory.

The polymeric polyamine used in the above example was prepared as follows:

Forty parts of a butadiene/styrene (1.8/1 mole ratio) polymer was dissolved in 160 parts benzene. Ten parts of an active nickel catalyst was added and the polymer was hydrogenated one hour at 100° C. under a pressure of 2000 pounds sq. in. of hydrogen. Fifteen parts of the resulting product was nitrated next with 110 parts of fuming nitric acid following the procedure of Example I of U. S. Patent No. 2,396,786. Fifteen parts of the resulting nitrated polymer was then dissolved in dioxane and reduced with mossy tin and hydrochloric acid to obtain a polymetric polyamine soluble in benzene and dilute acetic acid. The nitrated polymer can also be reduced by the procedures of Examples II and III of U. S. Patent No. 2,396,786. Polystyrene with a molecular weight of about 700 also was nitrated and reduced to an acetic acid-soluble polyamine by means of mossy tin and hydrochloric acid. This reduction product of nitrated polystyrene can be used as the polymeric polyamine in the foregoing example.

Example VII

White sateen fabrics were impregnated as described in Example I with a bath prepared as described in Example III. The impregnating bath contained 4 parts of paraffin wax, 2 parts of a polymeric polyamine, and 94 parts of water. The polymeric polyamine was made by the reduction of a butadiene/acrylonitrile/styrene polymer in which the mole ratio of monomers was 3/1/1. The polymeric polyamine had a neutral equivalent of 534, contained 3.1% of primary amino nitrogen, and had an iodine number of 16.

The treated fabrics were cured 10 minutes at 135° C. and had a spray-rating of 100. Afer three standard launderings and drying for 10 minutes at 135° C., the fabrics had a spray-rating of 80.

Example VIII

White sateen fabrics were impregnated as described in Example I with an impregnating bath prepared as described in Example III. The impregnating bath contained 4 parts of paraffin wax, 2 parts of polymeric polyamine, and 94 parts of water. The polymeric polyamine was made by the reduction of a butadiene/acrylonitrile polymer in which the mole ratio of monomers was 5/1. The polymeric polyamine contained 4.7% primary amino nitrogen, had a neutral equivalent of 325, and iodine number of 55, and a molecular weight of 2270.

The treated fabrics were cured 10 minutes at 120° C. and had a spray-rating of 100. After laundering three times and drying 10 minutes at 120° C. the spray-rating was 70.

Example IX

White sateen fabrics were treated as described in Example I with an impregnating bath prepared as described in Example III. The treating bath contained 4 parts paraffin wax, 2 parts of a polymeric polyamine, and 94 parts of water. The polymeric polyamine was made by the reduction of a butadiene/acrylonitrile polymer in which the mole ratio of reacting monomers was 4/1. The polymeric polyamine had a molecular weight of 1350, a neutral equivalent of 465, an iodine number of 9, and contained 3.25% primary amino nitrogen.

The treated fabrics spray rated 100 after curing 10 minutes at 120° C. After three standard launderings and drying at 120° C. for 10 minutes the spray-rating was 70.

In the practice of this invention there may be used any polymeric polyamine of the previously defined type. Particularly useful polymeric polyamines are those in which the amino groups are joined to the main polymer chain through a hydrocarbon radical of 1 to 7 carbon atoms. Examples of such polymeric p lyamines are the products obtained by reduction of acryl O- and methacrylonitrile polymer and co-polymers with polymerizable vinylidene compounds, i. e., polymerizable compounds containing a terminal doubly bonded methylene group, as disclosed and claimed in the copending application of Paul S. Pinkney, Serial No. 51,845, filed September 29, 1948, now abandoned, of which Serial No. 108,043, filed August 1, 1949 is a continuation-in-part. The polymeric polyprimary amines of this preferred species comprise a linear polymeric hydrocarbon chain to which are attached primary aminomethyl groups. These polymeric polyprimary amines are linear polymers characterized by a plurality of units of the formula

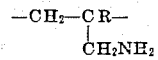

where in R is hydrogen or an alkyl group of one to six carbons. This unit may be the sole unit in the polymer but is usually associated with unreduced acrylonitrile or alkacrylonitrile units,

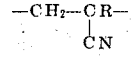

and may also include the polymeric units of any polymerizable vinylidene compound. The radical R in the foregoing formulas is preferably hydrogen or methyl, since acrylonitrile and methacrylonitrile are readily available.

Acrylonitrile polymers and copolymers are well known in the art and they may be prepared by any of the known procedures. In general, it is desirable that the polymer hydrogenated contain at least one nitrile group for each fifty carbon atoms of the linear polymeric chain. Since hydrogenation of the nitrile groups to aminomethyl groups is usually incomplete, it is preferred that the starting material contain at least one nitrile group for each six carbon atoms of the linear polymer chain and that the hydrogenation be continued until the resultant polymeric amine contains at least one amino group for each ten carbon atoms of the linear polymer chain.

Suitable polymerizable vinylidene compounds for polymerization with acrylonitrile or alkacrylonitrile are ethylene, propylene, butenes, 2-chloro-1,3-butadiene, isoprene, piperylene, 1,3-butadiene, styrene, vinyl acetate, vinyl chloride, vinyl trimethylacetate, vinyl fluoride, ethyl and methyl acrylates and methacrylates, vinylidene chloride, etc. The preferred acrylonitrile and alkacrylonitrile copolymers are those with polymerizable vinylidene hydrocarbons, e. g., 1,3-diene hydrocarbons such as 1,3-butadiene, because polymeric polyamines derived from them become insoluble as a result of oxidation on exposure to the air.

Other suitable polymeric polyamines are the products obtained by the reduction of poly(3-pentenenitrile), poly(nitrostyrene), nitrated butadiene/styrene copolymers, and the like. The preparation of polymers of 3-pentenenitrile is described in U. S. Patent No. 2,402,873. The nitration and reduction of styrene copolymers is described in U. S. Patent No. 2,396,786.

Although in the examples, the polymeric polyamine has been added to a dilute aqueous solution of an acid and the mixture stirred until it was dissolved, a preformed salt of the polymeric polyamine with an organic acid can be used and simply added to water or to an organic solvent. Suitable acids for the preparation of solutions of the polymeric polyamines, or salts thereof, are acetic, formic, propionic, isobutyric, succinic, maleic, malic, etc., tartaric, citric, lactic, benzoic, carbonic, etc. Boric, sulfuric, phosphoric, and aryl sulfonic acids may also be employed in preparing salts of the polymeric polyamines as can also halogen acids such as hydrochloric and hydrobromic. Salts of readily volatile acids are preferred in applications involving cellulosic materials. However, the use of strong acids is to be avoided because of the tendering effect which the acid has on the cellulose.

As the wax component of the compositions of this invention there can be used any synthetic or naturally occurring wax. Examples of suitable waxes are paraffin wax, micro-crystalline hydrocarbon waxes, polyethylenes of the type disclosed and claimed in U. S. Patent No. 2,153,553, hydrocarbon waxes obtained by hydrogenation of carbon monoxide, montan wax, carnauba wax, beeswax, polycarboxylic acid-polyhydric alcohol-long chain fatty acid polyesters, formaldehyde condensation products of amides of saturated fatty acids containing from 12 to 18 carbon atoms, e. g., methylenedistearamide, methylolstearamide, ethylenedistearamide, methylenedipalmitamide, methylenediarachylamide and the like, stearone, dicetylcarbonate, octadecylcycloethyleneurea, dioctadecylurea, thio-bis-stearamide, dioctadecyl amine, poly(n-butyl methacrylate), octadecylstearate, etc. For use in rendering textiles water-repellent, it is preferred that the wax component of the compositions be one containing 25 or more carbon atoms.

To the blends of wax and polymeric polyamine, there may be added ancillary materials, e. g., aldehydes. Formaldehyde and glyoxal are especially useful modifiers in water-repellent compositions because through their use improved initial water-repellency, as well as permanence to dry cleaning and laundering, is obtained. Furthermore, the use of aldehydes accelerates the insolubilization of the polymeric polyamines and permits curing of the treated textile at temperatures ranging from 20° C. to 100° C. in a relatively short time. The amount of aldehyde usually used is one mole per amino group in the polymer. The formaldehyde, or other aldehyde, may be used alone or in conjunction with an acid or acid reacting material such as ammonium bisulfate, ammonium chloride, camphorsulfonic acid ammonium salt, etc. In place of formaldehyde there may be used such derivatives as the methylolurea, methylolmelamine, bis(methoxymethyl)uron, etc.

Since the polymeric polyamines in the form of their salts with volatile organic acids, have dispersing properties it is not necessary to employ other deflocculating agents in the preparation of dispersions in aqueous systems. This property is of a transitory nature and hence it is lost upon decomposition of the salt. This is a valuable characteristic because it makes it possible to prepare dispersions without having the deflocculating agent contribute water-sensitivity to the resulting dry film. The polymeric polyamine salts which have been decomposed, as by heat-treatment, are not dispersible in dilute aqueous acid solutions.

Compositions having valuable water-repellency characteristics may be made by deflocculating a wax, e. g., methylolstearamide with polyvinyl alcohol and then diluting the resulting dispersion with a solution of the polymeric polyamine. Such compositions, especially when they contain a small amount of hydroxycarboxylic acid such as tartaric acid or an acid reacting material such as camphorsulfonic acid ammonium salt, impart to textiles superior water-repellency and permanence to laundering and dry cleaning.

The compositions of this invention are useful for the coating and impregnation of all sorts of substrates. They are particularly useful for imparting water-repellency to rigid and non-rigid bibulous substrates and especially to textile materials. The application to the substrate may be carried out by brushing, dipping or spraying, or by any combination of these methods. After application, excess solution is removed, if necessary, and the treated article is heated to between 90° and 180° C., preferably to between 90° and 140° C., for from 5 to 30 minutes to bring about insolubilization of the coating. If desired, the polymeric polyamine may be applied to the substrate either from a dispersion in water or from solution in an organic medium and then to the treated substrate there is applied the wax either from solution in an organic solvent or from an aqueous dispersion. On subjecting the treated article to heat treatment the polyamine and wax components fuse and blend together, providing the surface with a water-repellent coating. In another modification the polyamine and wax may be heated together to form a homogeneous blend, which is particularly useful for the coating of paper.

Suitable substrates for the application of the compositions of this invention are films, fibers, yarns, fabrics and other articles made from filaments, fibers or yarns derived from natural, modified natural or synthetic polymeric materials or from blends of these. Specific examples are paper, cotton, silk, regenerated cellulose, nylon, polyacrylonitrile, polyethylenes of the type disclosed and claimed in U. S. Patent No. 2,153,553, leather, hemp, sisal, coconut, etc., films, fabrics and fibers derived from casein, soya protein, peanut protein, gelatin, hydrolyzed ethylene/vinyl acetate polymers, polyvinyl alcohol, vinyl acetate/vinyl chloride polymers, etc., fiber-forming linear polyesters, asbestos, cellulose esters and ethers, e. g. cellulose nitrate, cellulose acetate, ethyl cellulose, etc., porous tile, wood, cork, etc. Dyed and undyed cotton sateen, poplin, broadcloth, jean cloth, gabardine, etc., are especially adaptable for treatment with the compositions of this invention to produce products possessing not only excellent water-repellency but which are also permanent to dry-cleaning and laundering. The compositions of this invention may also be applied to non-porous substrates, e. g. glass, metals, ceramics, etc.

The compositions of this invention per se or with added materials such as pigments, dyes, anti-oxidants, fillers, oils, natural and synthetic resins, asphalts, deflocculating agents, fire-retardants, fungicides, insecticides and the like are useful for the treatment of such fabricated articles as fabrics, paper, paper cartons, marine ropes, fishing leaders, etc., to impart water-repellency and thus enhance their fields of utility and life.

As many apparently widely different embodiments of this invention may be made without departing from the spirit and scope thereof, it is to be understood that this invention is not limited to the specific embodiments thereof except as defined in the appended claims.

We claim:

1. A composition comprising a blend of from 1 to 1200 parts by weight of a water-insoluble wax containing at least 19 carbon atoms and from 5 to 1 parts by weight of a polymeric amine having a main polymer chain consisting solely of carbon atoms with the amino groups attached to said main polymer chain solely through hydrocarbon radicals of from 1 to 7 carbon atoms which hydrocarbon radicals are lateral substituents thereon, said polymeric amine being the reduction product of a polymer having a main linear polymer chain consisting solely of carbon atoms with a plurality of carbon-nitrogen linkages in side chains, the carbon in said carbon-nitrogen linkages being joined to the nitrogen through a linkage from the group consisting of triple and single bonds with any remaining valences of the nitrogen in said linkages being satisfied solely by doubly bonded oxygen.

2. A composition as set forth in claim 1 in which the ratio of said wax to said polymeric amine is from 2:1 to 10:1 parts by weight.

3. A composition comprising a blend of from 1 to 1200 parts by weight of a water-insoluble wax containing at least 19 carbon atoms and from 5 to 1 parts by weight of a polymeric amine having a main polymer chain consisting solely of carbon atoms with aminomethyl groups directly attached to said main polymer chain as lateral substituents thereon, said polymeric amine being the reduction product of an acrylonitrile polymer having a main linear polymer chain consisting solely of carbon atoms and having at least one nitrile group directly attached to said main polymer chain as a lateral substituent thereon for each fifty carbon atoms of the main linear polymer chain.

4. A composition comprising a blend of from 1 to 1200 parts by weight of a water-insoluble wax containing at least 19 carbon atoms and from 5 to 1 parts by weight of a polymeric amine having a main polymer chain consisting solely of carbon atoms with aminomethyl groups directly attached to said main polymer chain as lateral substituents thereon, said polymeric amine being the reduction product of an alkacrylonitrile polymer having a main linear polymer chain consisting solely of carbon atoms and having at least one nitrile group directly attached to said main polymer chain as a lateral substituent thereon for each fifty carbon atoms of the main linear polymer chain.

5. A composition comprising a blend of from 1 to 1200 parts by weight of a water-insoluble wax containing at least 19 carbon atoms and from 5 to 1 parts by weight of a polymeric amine having a main polymer chain consisting solely of carbon atoms with aminomethyl groups directly attached to said main polymer chain as lateral substituents thereon, said polymeric amine being the reduction product of a copolymer of acrylonitrile and another polymerizable vinylidene compound, said copolymer having a main linear polymer chain consisting solely of carbon atoms and having at least one nitrile group directly attached to said main polymer chain as a lateral substituent thereon for each fifty carbon atoms of the main linear polymer chain.

6. A composition comprising a blend of from 1 to 1200 parts by weight of a water-insoluble wax containing at least 19 carbon atoms and from 5 to 1 parts by weight of a polymeric amine having a main polymer chain consisting solely of carbon atoms with aminomethyl groups directly attached to said main polymer chain as lateral substituents thereon, said polymeric amine being the reduction product of a copolymer of an alkacrylonitrile and another polymerizable vinylidene compound, said copolymer having a main linear polymer chain consisting solely of carbon atoms and having at least one nitrile group directly attached to said main polymer chain as a lateral substituent thereon for each fifty carbon atoms of the main linear polymer chain.

7. A composition comprising a blend of from 1 to 1200 parts by weight of a water-insoluble wax containing at least 19 carbon atoms and from 5 to 1 parts by weight of a polymeric amine having a main polymer chain consisting solely of carbon atoms and aminomethyl groups directly attached to said main polymer chain as lateral substituents thereon, said polymeric amine being the reduction product of a copolymer of methacrylonitrile and another polymerizable vinylidene compound, said copolymer having a main linear polymer chain consisting solely of carbon atoms and having at least one nitrile group directly attached to said main polymer chain as a lateral substituent thereon for each fifty carvon atoms of the main linear polymer chain.

8. A composition as set forth in claim 5 in which the ratio of said wax to said polymeric amine is from 2:1 to 10:1 parts by weight and said polymeric amine is the reduction product of a butadiene/acrylonitrile copolymer having a main linear polymer chain consisting solely of carbon atoms and having at least one nitrile group directly attached to said main polymer chain as a lateral substituent thereon for each fifty carbon atoms of the main linear polymer chain.

9. A composition as set forth in claim 7 in which the ratio of said wax to said polymeric amine is from 2:1 to 10:1 parts by weight and said polymeric amine is the reduction product of a butadiene/methacrylonitrile copolymer having a main linear polymer chain consisting solely of carbon atoms and having at least one nitrile group directly attached to said main polymer chain as a lateral substituent thereon for each fifty carbon atoms of the main linear polymer chain.

10. A composition as set forth in claim 1 in which said wax is methylenedistearamide.

11. A composition as set forth in claim 1 in which said wax is paraffin wax.

12. A composition as set forth in claim 5 in which said another polymerizable vinylidene compound is styrene.

13. A composition comprising a blend of from 1 to 1200 parts by weight of paraffin wax and from 5 to 1 parts by weight of a polymeric amine having a main carbon chain consisting solely of carbon atoms with aminomethyl groups directly attached to said main polymer chain as lateral substituents thereon, said polymeric amine being the reduction product of a butadiene/acrylonitrile/styrene copolymer, said copolymer having a main linear polymer chain consisting solely of carbon atoms and having at least one nitrile group directly attached to said main polymer chain as a lateral substituent thereon for each fifty carbon atoms of the main linear polymer chain.

DAVID M. McQUEEN.
JAMES H. WERNTZ.

REFERENCES CITED

The following references are of record in the file of this patent:

UNITED STATES PATENTS

| Number | Name | Date |
|---|---|---|
| 2,136,177 | Carothers | Nov. 8, 1938 |
| 2,166,150 | Howk | July 18, 1939 |
| 2,198,936 | Frey et al. | Apr. 30, 1940 |
| 2,456,428 | Parker | Dec. 14, 1948 |

OTHER REFERENCES

"The Chemistry and Technology of Waxes," by Warth, published in 1947 by Reinhold Publishing Corp., N. Y., New York, page 303.